(12) United States Patent
Seraj

(10) Patent No.: US 9,190,815 B2
(45) Date of Patent: Nov. 17, 2015

(54) METHOD FOR INSTALLING COVER SLEEVES ON ELECTRICAL CONNECTIONS

(71) Applicant: Tyco Electronics Corporation, Berwyn, PA (US)

(72) Inventor: Mahmoud Seraj, Apex, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 172 days.

(21) Appl. No.: 13/755,880

(22) Filed: Jan. 31, 2013

(65) Prior Publication Data

US 2014/0208591 A1   Jul. 31, 2014

(51) Int. Cl.
*H02G 1/14* (2006.01)
*H02G 15/18* (2006.01)
*H01B 13/06* (2006.01)

(52) U.S. Cl.
CPC ............. *H02G 1/14* (2013.01); *H01B 13/062* (2013.01); *H02G 15/1826* (2013.01); *Y10T 29/49174* (2015.01); *Y10T 29/49195* (2015.01); *Y10T 29/532* (2015.01); *Y10T 29/53217* (2015.01)

(58) Field of Classification Search
CPC . H01B 13/062; H02G 15/1826; H02G 15/18; H02G 1/14; Y10T 29/49174; Y10T 29/49195; Y10T 29/53217
See application file for complete search history.

(56) References Cited

U.S. PATENT DOCUMENTS

| | | | |
|---|---|---|---|
| 3,017,905 A | 1/1962 | Klein | |
| 3,057,233 A | 10/1962 | Turner | |
| 3,868,136 A | 2/1975 | Schweitzer, Jr. | |
| 3,946,480 A * | 3/1976 | Dienes | 29/235 |
| 4,965,930 A | 10/1990 | Wnukowski | |
| 5,564,852 A | 10/1996 | Maxwell et al. | |
| 5,593,196 A | 1/1997 | Baum et al. | |
| 6,049,960 A * | 4/2000 | Pilling et al. | 29/450 |
| 6,453,776 B1 | 9/2002 | Beattie et al. | |
| 6,642,464 B1 | 11/2003 | Taylor | |
| 7,111,526 B1 | 9/2006 | Flojo | |

(Continued)

FOREIGN PATENT DOCUMENTS

| | | |
|---|---|---|
| DE | 3001158 A1 | 7/1980 |
| DE | 19807840 | 8/1999 |

(Continued)

OTHER PUBLICATIONS

International Search Report Corresponding to International Application No. PCT/US2014/013267; Date of Mailing: May 9, 2014 (2 pages).

(Continued)

*Primary Examiner* — Livius R Cazan
(74) *Attorney, Agent, or Firm* — Myers Bigel Sibley & Sajoevc, PA

(57) ABSTRACT

A method for installing an elastomeric cover sleeve on an electrical connection including a connector and a cable having a cable axis includes: providing an installation tool including a slide portion; premounting the installation tool on the cable such that the slide portion extends along the cable axis and covers a portion of the cable; thereafter, sliding the cover sleeve onto the cable and onto the slide portion of the premounted installation tool to a parked position wherein the slide portion is interposed between the cover sleeve and the cable; installing the connector onto the cable; and thereafter, sliding the cover sleeve along the cable axis and the slide portion onto the connector.

10 Claims, 6 Drawing Sheets

(56) References Cited

U.S. PATENT DOCUMENTS

| | | |
|---|---|---|
| 7,181,995 B2 | 2/2007 | Rider |
| 7,721,459 B2 | 5/2010 | Niles |

FOREIGN PATENT DOCUMENTS

| | | |
|---|---|---|
| EP | 0368235 A2 | 5/1990 |
| EP | 0 815 624 B1 | 5/1999 |
| FR | 2685564 A1 | 6/1993 |
| WO | WO89/00782 A1 | 1/1989 |
| WO | WO 96/29767 A1 | 9/1996 |
| WO | WO 9629767 A1 | 9/1996 |
| WO | WO 02/07280 A1 | 1/2002 |
| WO | WO 02/07281 A1 | 1/2002 |

OTHER PUBLICATIONS

Notification Concerning Transmittal of International Preliminary Report on Patentability in corresponding PCT Application No. PCT/US2014/013267, mailed Aug. 13, 2015 (10 pages).

* cited by examiner

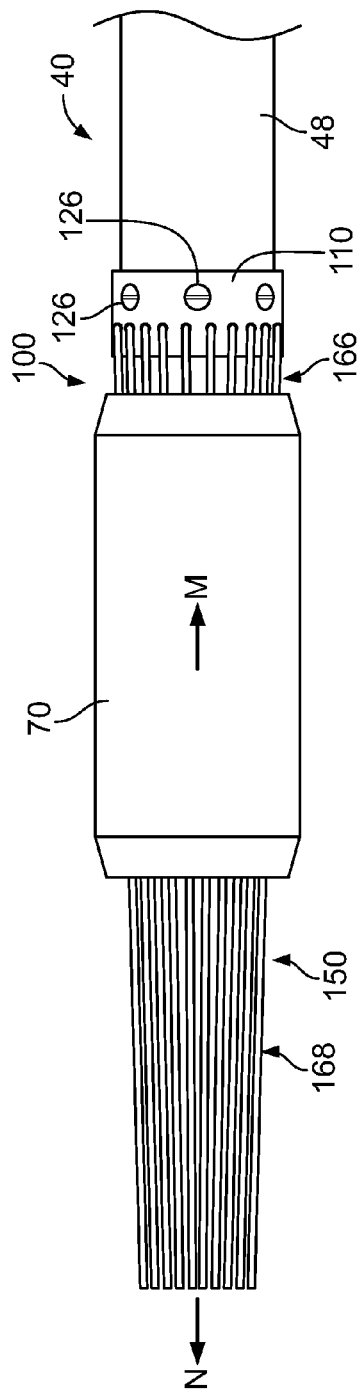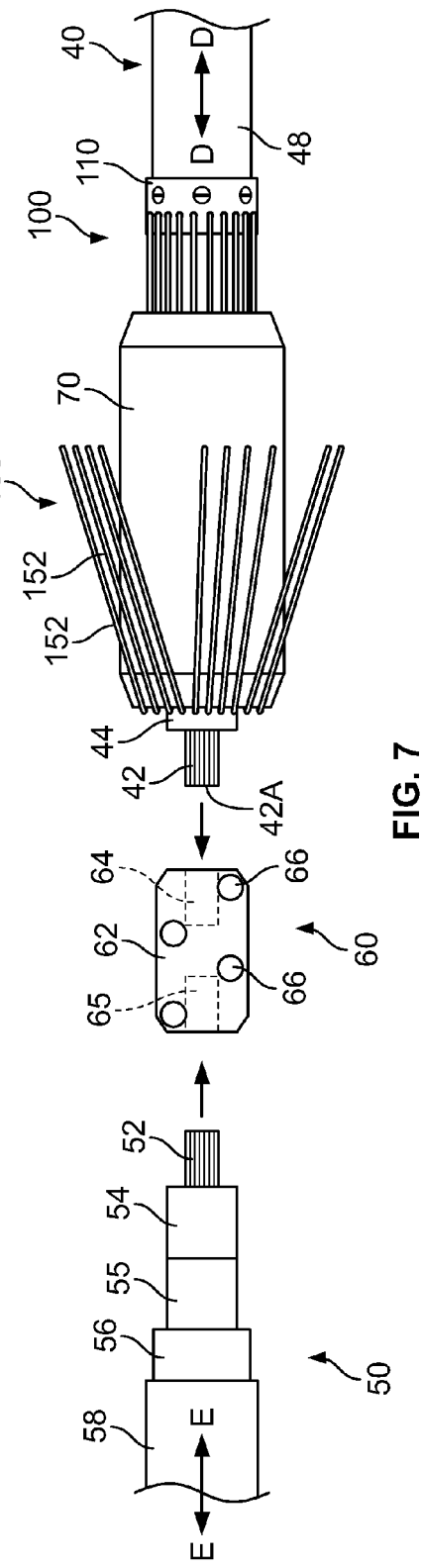

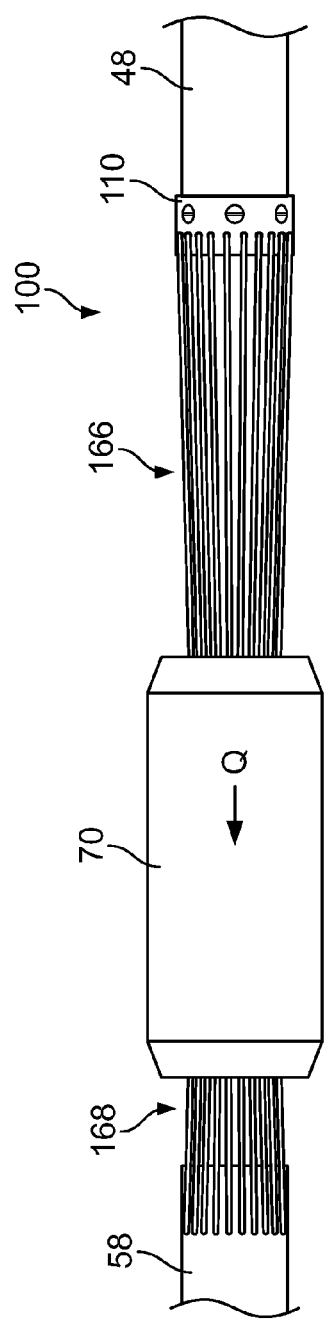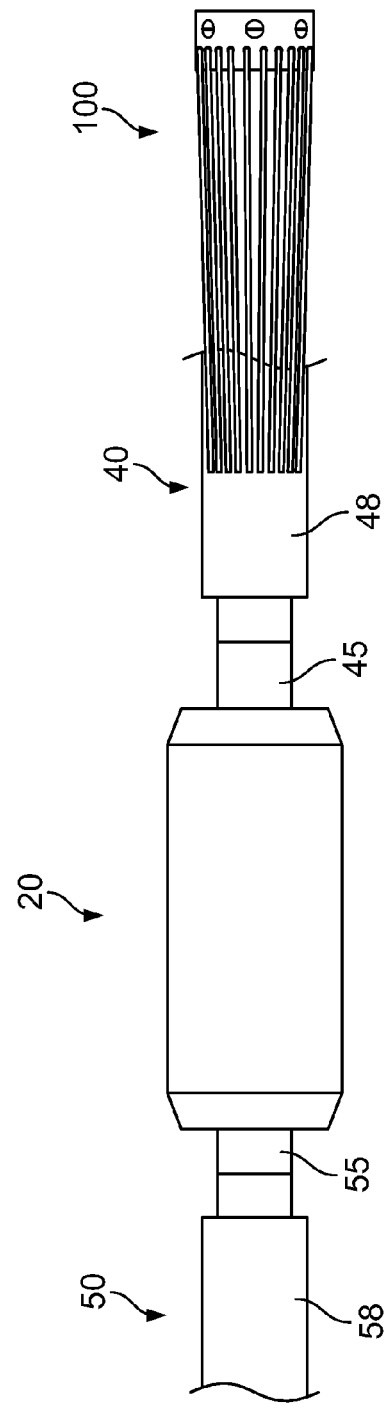

METHOD FOR INSTALLING COVER SLEEVES ON ELECTRICAL CONNECTIONS

FIELD OF THE INVENTION

The present invention relates to electrical cables and connections and, more particularly, to tools and methods for installing protective covers on electrical cables and electrical connections.

BACKGROUND OF THE INVENTION

In the electrical utilities industry, maintaining cable integrity may be critical. A loss of cable integrity, for example, a short circuit in a high voltage cable, may result in a crippling power outage or, even worse, a loss of life. One everyday task that may pose a great threat to cable integrity is the formation of electrical connections.

When electrical connections are formed, a bare metal surface may be exposed such as a splice connector. These bare metal surfaces may be particularly hazardous when formed in the field where they are exposed to the environment. This environment may include rocks and other sharp objects as well as moisture when the connection is to be buried under ground and rainfall when the connection is to be suspended in the air. Thus, there is a need to protect such electrical connections from the environment.

SUMMARY OF THE INVENTION

According to method embodiments of the present invention, a method for installing an elastomeric cover sleeve on an electrical connection including a connector and a cable having a cable axis includes: providing an installation tool including a slide portion; premounting the installation tool on the cable such that the slide portion extends along the cable axis and covers a portion of the cable; thereafter, sliding the cover sleeve onto the cable and onto the slide portion of the premounted installation tool to a parked position wherein the slide portion is interposed between the cover sleeve and the cable; installing the connector onto the cable; and thereafter, sliding the cover sleeve along the cable axis and the slide portion onto the connector.

According to embodiments of the present invention, an installation tool for installing an elastomeric cover sleeve on an electrical connection including a connector and a cable having a cable axis includes a base ring and a slide portion extending axially from the base ring. The installation tool is configured to be premounted on the cable such that the slide portion extends along the cable axis and covers a portion of the cable, and the base ring extends about the cable and axially secures the slide portion to the cable. When so mounted, the cover sleeve can be slid onto the cable and onto the slide portion to a parked position wherein the slide portion is interposed between the cover sleeve and the cable. The cover sleeve can thereafter be slid along the cable axis and the slide portion onto the connector.

According to embodiments of the present invention, an installation tool for installing an elastomeric cover sleeve on an electrical connection including a connector and a cable having a cable axis includes a base ring and a slide portion. The slide portion includes a plurality of elongate strands extending axially from the base ring. The base ring is configured to extend around the cable and to axially secure the elongate strands to the cable. The elongate strands are configured to slide the cover sleeve over when the installation tool is mounted on the cable.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIGS. 5-11 illustrate steps of methods according to embodiments of the present invention for mounting the cover sleeve of FIG. 3 on an electrical connection using the installation tool of FIG. 1.

DETAILED DESCRIPTION OF EMBODIMENTS OF THE INVENTION

Figure 1:
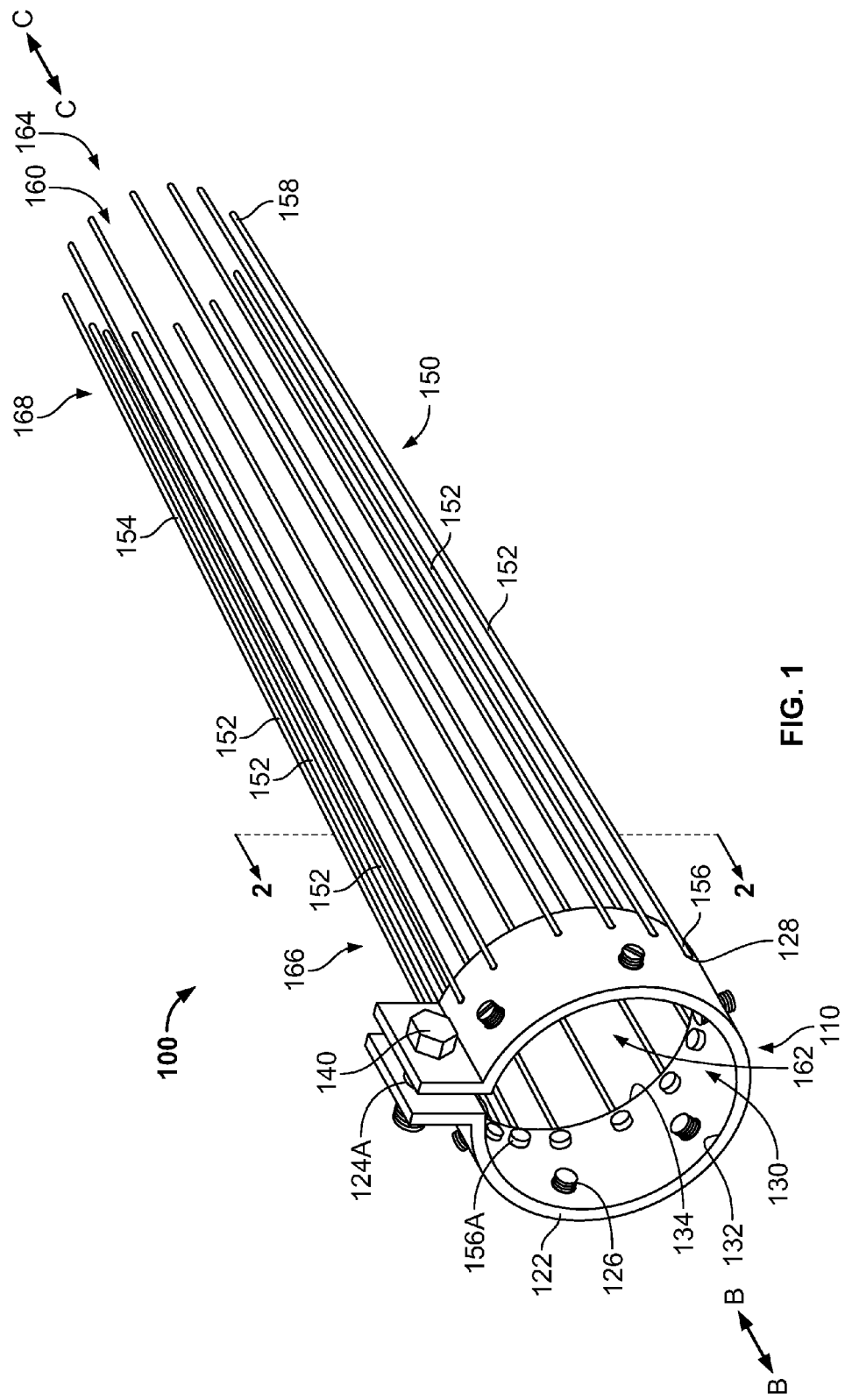
FIG. 1 is a perspective view of an installation tool according to embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the Figures. It will be understood that the spatially relative terms are intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "cold-applied" or "cold-applied cover" means that the cover or component can be assembled or installed about a substrate (e.g., a cable) without requiring the use of applied heat at the time of installation.

As used herein, "cold shrink" or "cold shrink cover" means that the cover or component can be shrunk or contracted about a substrate (e.g., a cable) without requiring the use of applied heat.

Figure 2:
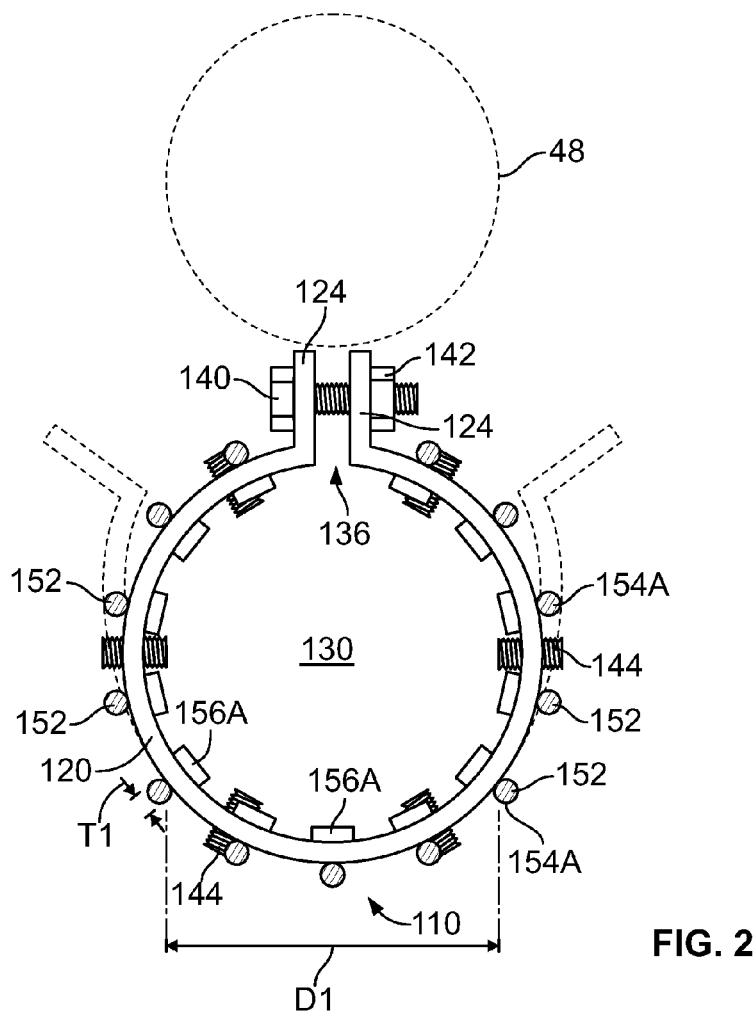
FIG. 2 is a cross-sectional view of the installation tool of FIG. 1 taken along the line 2-2 of FIG. 1.

With reference to FIGS. 1 and 2, a cover sleeve installation tool 100 according to some embodiments of the present invention is shown therein. The tool 100 may be used to install an elastomeric joint body or cover sleeve 70 on an electrical connection 15 (FIG. 8) to form an environmentally protected connection 20 (FIG. 11). The connection 15 may include a pair of elongate cables 40, 50 connected or spliced by a connector 60. In some embodiments, the cover sleeve 70 is elastically radially expanded when ultimately mounted on the connection 15.

According to some embodiments, the cover sleeve 70 (FIG. 3) is a cold shrink cover, meaning that it can be shrunk or retracted about the substrate without requiring the use of applied heat. The cover sleeve 70 has a lengthwise axis A-A and includes a tubular insulation sleeve or body 72. The body 72 has opposed inner and outer surfaces 72A and 72B, and opposed ends 74, 75. The body 72 is tubular and the inner surface 72A defines an axially extending through passage 76 that communicates with opposed end openings 74, 75.

The body 72 can be formed of any suitable material. According to some embodiments, the body 72 is formed of a dielectric or electrically insulative material. According to some embodiments, the body 72 is formed of an elastically expandable material. According to some embodiments, the body 72 is formed of an elastomeric material. According to some embodiments, the body 72 is formed of liquid silicone rubber (LSR). Other suitable materials may include EPDM or ethylene propylene rubber (EPR). According to some embodiments, the body 72 has a Modulus at 100 percent elongation (M100) in the range of from about 0.4 to 0.52 MPa.

According to some embodiments, the thickness of the body 72 is in the range from about 7 to 9 inches. According to some embodiments, the length L1 of the body 72 is in the range from about 24 to 32 inches.

The cover sleeve 70 may also include an integral, tubular Faraday cage layer defining a portion of the passage 76, a pair of integral, tubular stress cone layers defining portions of the passage 76 adjacent the openings 75, and an integral semiconductor layer on the outer surface of the body 72. The Faraday cage and stress cones may be formed of a suitable elastically conductive elastomer. The semiconductor layer can be formed of any suitable electrically semiconductive material.

The installation tool 100 has a tool axis B-B and includes a base assembly 110 and an integral slide portion 150. The tool 100 may be used with a supplemental clamp 102 (FIG. 9) and a lubricant, which collectively form an installation tool system 101. The lubricant may be a grease (e.g., a silicone grease), for example. The components of the system 101 may be packaged as a combined kit. The kit may further include the cover sleeve 70 and/or the connector 60.

The base assembly 110 includes a base ring 120, a clamp bolt, a clamp nut, and a plurality of retention screws 144.

The base ring 120 has a base axis coincident with the tool axis B-B. The base ring 120 includes a ring body 122 and radially upstanding tabs 124 extending from opposed ends of the ring body 122. The ring body 122 defines opposed openings 132, 134 and a through passage 130 extending between and communicating with each of the openings 132, 134. A side opening or radial slot 136 is defined between the ring body ends and the tabs 124. Bolt holes 124A are defined in the tabs 124. Threaded screw holes 126 and strand anchor holes 128 are defined in the ring body 122 and are circumferentially distributed.

The base ring 120 may be formed of any suitable material(s). According to some embodiments, the base ring 120 is flexible and bendable. According to some embodiments, the base ring 120 is formed of metal. Suitable metals may include aluminum or steel. According to some embodiments, the base ring 120 is formed of a polymeric material. Suitable polymeric materials may include ABS, polycarbonate or nylon.

The clamp bolt 140 can be inserted through the bolt holes 124A and secured by the clamp nut 142 to compress and secure the tabs 124 together.

The retention screws 144 are each threaded seated in a respective one of the screw holes 126. Each retention screw 144 has a driver engagement feature 144A (e.g., a screwdriver blade slot as shown) and an opposing engagement end 144B. In some embodiments, the engagement is end 144B is substantially flat.

The slide portion 150 has a base axis coincident with the tool axis B-B. The slide portion 150 has a distal end 150A adjacent the base ring 120 and a proximal end 150B distal or spaced from the base ring 120. The slide portion 150 is formed of a plurality of elongate strands 152. Each strand 152 includes a strand body 154 having an attached end 156 and a free end 158. Each attached end 156 extends through a respective strand hole 128 in the base ring 120 and is coupled or secured to the base ring 120 by a corresponding integral attachment or stop head 156A. Each strand 152 has a strand axis C-C generally parallel with the tool axis B-B. Each strand has an outer engagement surface 154A. According to some embodiments, the engagement surfaces 154A are rounded or arcuate. In some embodiments, each strand 152 is substantially round or circular in cross-section.

The strands 152 collectively define a slide portion through passage 106 (coaxial with the tool axis B-B) terminating in opposed end openings 162, 164. The slide portion 150 includes a distal portion 166 adjacent the base ring 120 and the opening 162, and further includes a proximal portion adjacent the free ends 158 and the opening 164.

The strands 152 may be formed of any suitable material(s). According to some embodiments, the strands 152 are flexible and bendable. According to some embodiments, the strands 152 are formed of a polymeric material. Suitable polymeric materials may include nylon, polytetrafluoroethylene (PTFE), nitinol or steel. In some embodiments, the strands 152 are formed of polytetrafluoroethylene (PTFE). In some embodiments, the strands 152 are formed of metal wire.

Figure 5:
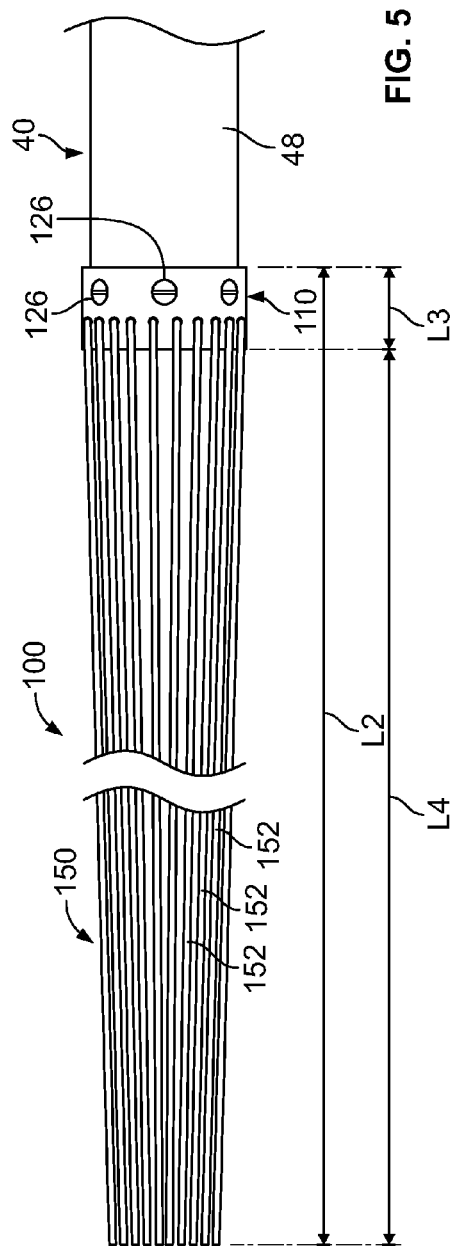

According to some embodiments, the overall length L2 (FIG. 5) of the tool 100 is in the range of from about 4 to 6 feet.

According to some embodiments, the length L3 (FIG. 5) of the base ring 120 is in the range of from about 2 to 3 inches.

According to some embodiments, the length L4 (FIG. 5) of the slide portion 150 (i.e., the length of the strands 152) is in the range of from about 18 to 38 inches.

According to some embodiments, the diameters D1 (FIG. 2) of the through passages 130, 160 and the openings 132, 134, 162, 164 are in the range of from about 4 to 6 inches. According to some embodiments, the diameters D1 are in the range of from about 0.25 to 0.75 inch greater than the outer diameter of the largest cable 40 with which the tool 100 is intended for use.

According to some embodiments, each strand 152 has a thickness T1 (FIG. 2) in the range of from about 0.6 to 0.8 inch. According to some embodiments, each strand 152 has a length L4 to thickness T1 ratio of at least 20:1 and, in some embodiments, in the range of from about 20:1 to 70:1.

Figure 3:
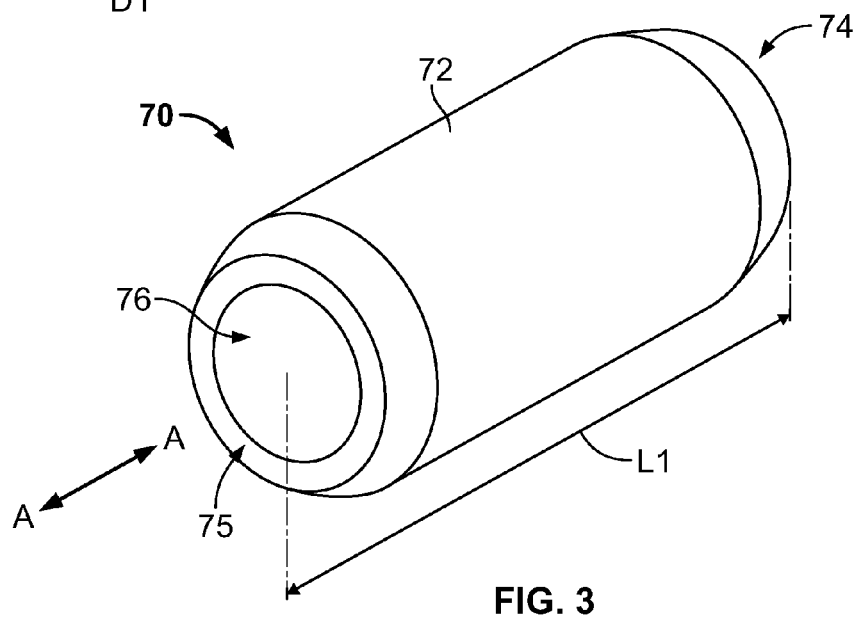
FIG. 3 is a perspective view of an elastomeric cover sleeve for use in methods according to embodiments of the present invention and with the installation tool of FIG. 1.

Referring now to FIG. 3, the cover sleeve 70 may be applied over a splice connection 15 between a pair of electrical power transmission cables 40, 50 to form a protected connection assembly 20. According to some embodiments, the cables 40, 50 are medium-voltage (e.g., between about 68 and 230 kV) or high-voltage power transmission cables. According to some embodiments, the cables 40, 50 are concentric neutral cables. According to some embodiments, the cables 40, 50 are metal tape shielded or longitudinally corrugated (LC) metal shielded cables. The cable 40 has a cable axis D-D and the cable 50 has a cable axis of E-E.

Figure 4:
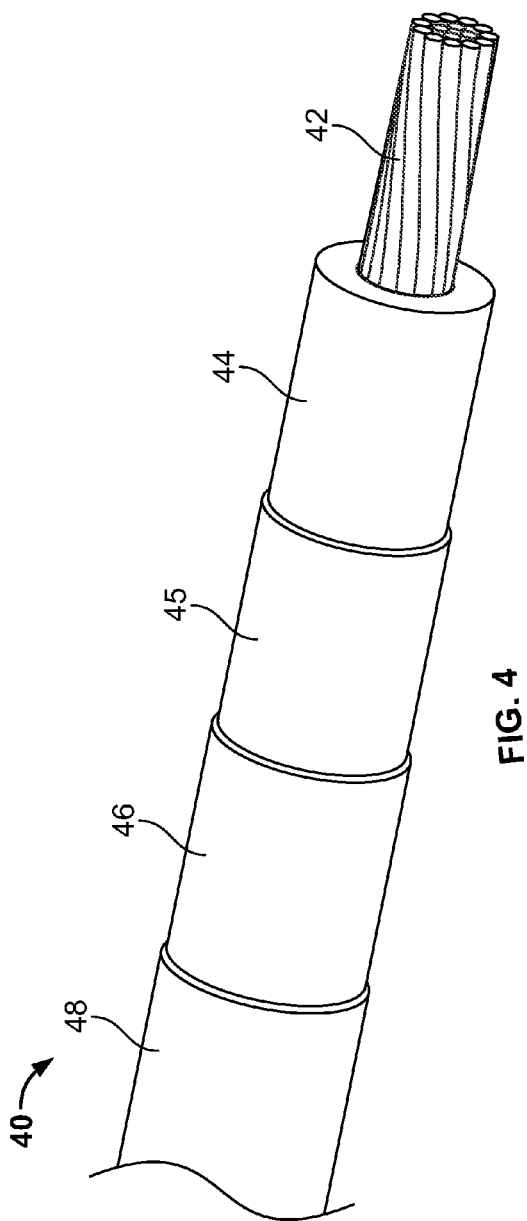
FIG. 4 is a fragmentary, perspective view of an exemplary polymeric insulated power transmission cable for use with the installation tool of FIG. 1.

As shown in FIG. 4, the cable 40 includes a primary electrical conductor 42, a polymeric insulation layer 44, a semiconductor layer 45, a metal electromagnetic radiation shield layer 46, and a jacket 48, with each component being concentrically surrounded by the next.

According to some embodiments and as shown, the shield layer 46 is a metal tape, foil, strip or sheath fully circumferentially surrounding the semiconductor layer 45 along the length of the cable. The metal strip may be longitudinally or helically wrapped about the semiconductor layer 45, for example. According to some embodiments, the cable 40 is an LC shielded cable and the shield layer 46 is a thin corrugated metal layer. In other embodiments, the shield layer 46 may include individual wires, which may be helically wound about the semiconductor layer 45.

The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The shield layer 46 may be formed of any suitable material such as copper. The jacket 48 may be formed of any suitable material such as EPDM or PVC.

The cable 50 (FIG. 7) is similarly constructed with a primary electrical conductor 52, a polymeric insulation layer 54, a semiconductor layer 55, a metal shield layer 56, and a jacket 58 corresponding to components 42, 44, 45, 46 and 48, respectively.

The connector 60 may be any suitable type of connector such as a metal clamp bolt connector (e.g., as shown) or a crimp connector. The illustrated connector 60 includes a body 62 having opposed conductor bores 64, 65 defined therein and sized to receive the conductors 42, 52 therein. Clamp bolts 66 (in some embodiments, shear bolts) are provided to secure the cable conductors 42, 52 in the bores 64, 65.

The connection assembly 20 may be formed and the cover sleeve 70 may be installed as follows using the installation tool 100. The cables 40, 50 are prepared as shown in FIGS. 4 and 7 such that a segment of each layer extends beyond the next overlying layer.

The tool 100 is slid axially over the cable 40. More particularly, the tool 100 is slid onto the cable 40 from the terminal end 42A with the base ring 120 leading and the slide portion 150 (i.e., the strands 152) trailing. The cable 40 is received in and extends through the openings 132, 134, 162, 164 and the passages 130, 160. According to some embodiments, the inside diameter of the base ring 120 is greater than the outer diameter of the cable 40 such that the inner diameter of the base ring 120 is sufficient to receive the jacket 48 of the prepared cable 40 without undue effort. The base ring 120 is axially positioned on the cable 40 such that the base ring 120 surrounds a portion of the jacket 48, the distal portion 166 surrounds the exposed portions of the shield layer 46, the semiconductor layer 45 and the insulation layer 44, and the proximal portion 168 surrounds the exposed portion of the conductor 42 and extends beyond the conductor 42. The bolt 140 and nut 142 may be tightened to close the base ring 120 about the cable jacket 148. This may be sufficient to affix the base ring 120 to the jacket 48. In some embodiments, the retention screws 144 are driven (e.g., using a driver and the drive features 144A) to load their engagement faces 144B onto or into the jacket 48 outer surface. A lubricant may be pre-installed or field-applied to the strands 152.

The strands 152 are pulled together and the cover sleeve is slid over the strands 152 in an axial direction M such that the strands 152 extend through the passage 76 of the cover sleeve 70 as shown in FIG. 6. According to some embodiments, the free ends of the strands 152 are held tight or pulled in a direction N to maintain a tensile load on the strands 152 as the cover sleeve 70 is slid into position. The cover sleeve 70 is slid in the direction M until the cover sleeve 70 reaches a parked position on the cable 40 proximate the base ring 120 and with the distal portion 166 of the slide portion 150 radially interposed between the cover sleeve 70 and the cable 40. In some embodiments, this step causes the cover sleeve 70 to elastically radially expand and to remain in an expanded condition while parked.

The proximal portion 168 is then folded, pulled or pushed away from the proximal end 42A of the cable. According to some embodiments, the portions of the strands 152 forming the proximal portion 168 are folded back over the cover sleeve 70 towards the base ring 120 as shown in FIG. 7. In this way, the slide portion 150 is temporarily moved out of the way of the splicing or working zone.

Figure 8:
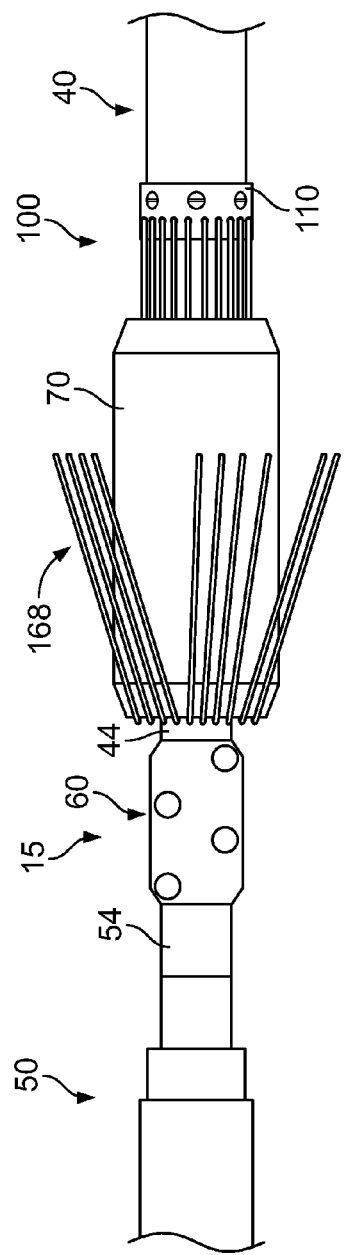

The splice connection 15 can then be formed as shown in FIG. 8. The connector 60 is installed on each of the cables 40, 50 so that the conductor 42 is secured in the bore 64 and the conductor 52 is secured in the bore 65. In this manner, the conductors 42, 52 are mechanically and electrically connected.

Figure 9:
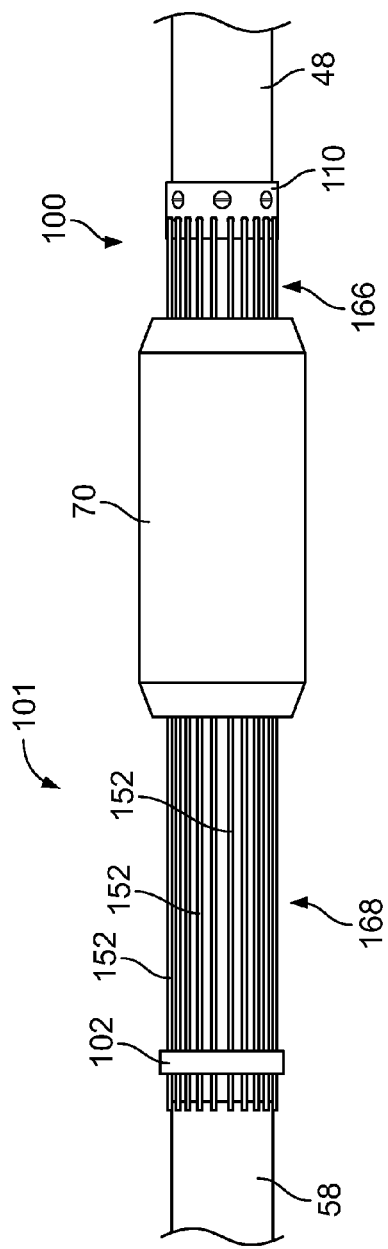

The portions of the strands 152 forming the proximal portion 168 are then folded back away from the base ring 120 to surround the installed connector 60 as shown in FIG. 9. Lubricant may be re-applied to the strands 152.

The cover sleeve 70 is then slid axially along the cable 40 and the slide portion 150 onto the proximal portion 168 in a direction Q as shown in FIG. 10. The cover sleeve 70 is slid until it is repositioned in an installed position surrounding the connector 60. To assist in this operation or step, the operator may pull on the proximal end 150B or may clamp the proximal end 150B to the jacket 58 in tension using a clamp 102, for example.

The base ring 120 is then loosened (by backing out the bolt 140 and/or the retention screws 144) and the proximal end 150B is released (e.g., by removing the clamp 102, if present). The tool 100 is then pulled axially in a direction R as shown in FIG. 11 to withdraw the slide portion 150 from between the cover sleeve 70 and the connector 60. The operator may hold the cover sleeve 70 in place to ensure that it is not undesirably displaced as the slide portion 150 is removed. According to some embodiments, the installed cover sleeve 70 extends beyond the ends of the connector 60 and overlaps and engages the semiconductor layers 45, 55 of the cables 40, 50.

The tool 100 can then be fully removed from the cable 40. In some embodiments, the bolt 140 is removed or disengaged and the ring body 122 is bent open to widen the slot 136, and the tool 100 is then laterally removed from the cable 40 (or vice-versa), as illustrated in dashed lines in FIG. 2.

According to some embodiments, the relaxed inner diameter of the cover sleeve 70 is less than at least the outer diameter of the cable insulation layers 44, 54. Therefore, the installed cover sleeve 70 is radially outwardly elastically expanded so that the cover sleeve 70 exerts a persistent radially inwardly compressive or clamping force or pressure (due to elastic tension) onto the connector 60 and the cables 40, 50. According to some embodiments, the relaxed inner diameter of the cover sleeve 70 is at least 10% less than the smallest diameter cable upon which the cover sleeve 70 is intended to be installed.

The protected connection 20 can be further covered with a tubular, electrically conductive (e.g., metal) shield layer and a tubular, electrically insulating (e.g., elastomeric) outer sleeve in known manner, for example.

While the base ring 120 as described above is removed by circumferentially bending the ring body 122, other removal mechanisms or techniques may be provided or used. In some embodiments, the base ring includes two separate pieces joined by a hinge about which they are pivoted to open the base ring. In some embodiments, the base ring is cut off from the cable. Other types of mechanisms can be used to close the slot 136 and/or to affix the base ring to the cable. In some embodiments, the base ring is an endless loop or band.

Tools and methods according to embodiments of the present invention can advantageously facilitate installation of a cover sleeve or joint body on a connection. The tool (e.g., the tool 100) can substantially reduce the resistance to sliding the cover sleeve into position on the cable and the connection, thereby reducing the risk of damaging the cover sleeve and the effort required to install the cover sleeve. The tool can used in lieu of a pre-installed holdout of the like.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A method for installing an elastomeric cover sleeve on an electrical connection including a connector and a cable having a cable axis, the method comprising:

providing an installation tool including a slide portion, the slide portion including an axially proximal section and an axially distal section;

premounting the installation tool on the cable such that the slide portion extends along the cable axis and covers a portion of the cable; thereafter sliding the cover sleeve onto the cable and onto the slide portion of the premounted installation tool to a parked position wherein the slide portion is interposed between the cover sleeve and the cable;

installing the connector onto the cable; and thereafter sliding the cover sleeve along the cable axis and the slide portion onto the connector;

wherein:

the step of sliding the cover sleeve onto the cable and onto the slide portion includes sliding the cover sleeve past the proximal section and onto the distal section;

the step of sliding the cover sleeve along the cable axis and onto the connector includes sliding the cover sleeve from the distal section onto the proximal section, wherein the proximal section covers the connector; and the method includes:

between the steps of sliding the cover sleeve onto the distal section and sliding the cover sleeve onto the proximal section, folding the proximal section away from the cable axis to facilitate installation of the connector on the cable; and between the steps of installing the connector on the cable and sliding the cover sleeve onto the proximal section, folding the proximal section back toward the cable axis and onto the cable.

2. The method of claim 1 further including, after the step of sliding the cover sleeve onto the proximal section, withdrawing the proximal section from between the cover sleeve and the connector while maintaining the cover sleeve on the connector.

3. The method of claim 1 wherein the cover sleeve is elastically radially expanded when in the parked position and when mounted on the connector.

4. The method of claim 1 further including:

prior to the step of sliding the cover sleeve onto the connector, securing a second cable to the connector so that the first and second cables are mechanically and electrically connected by the connector;

wherein, when installed, the cover sleeve spans each of the first cable, the connector, and the second cable.

5. The method of claim 1 including anchoring a distal end of the slide portion to the cable prior to the step of sliding the cover sleeve along the slide portion onto the connector.

6. The method of claim 5 wherein:

the installation tool includes a base ring secured to the distal end of the slide portion and a retention mechanism on the base ring; and the step of anchoring the distal end of the slide portion to the cable includes mounting the base ring around the cable and actuating the retention mechanism to secure the base ring to the cable.

7. The method of claim 1 wherein the slide portion includes a plurality of axially extending, elongate strands.

8. The method of claim 7 wherein the strands are formed of a polymeric material.

9. The method of claim 7 wherein the strands are formed of polytetrafluoroethylene.

10. The method of claim 7 wherein the strands are formed of metal wire.

* * * * *